United States Patent Office 3,293,300
Patented Dec. 20, 1966

3,293,300
NOVEL 6-SUBSTITUTED 17α-ALKYL-B-
NORTESTOSTERONE DERIVATIVES
Louis R. Fare, Willingboro, and Kenneth G. Holden, Stratford, N.J., and Joseph R. Valenta, Philadelphia, Pa., assignors to Smith Kline & French Laboratories, Philadelphia, Pa., a corporation of Pennsylvania
No Drawing. Filed Mar. 10, 1964, Ser. No. 350,671
10 Claims. (Cl. 260—586)

This invention relates to novel 6-substituted-17α-alkyl-B-nortestosterone derivatives having utility as antiandrogenic compounds, as central nervous system depressants (sedatives) and as intermediates for preparing other B-nor-derivatives having similar utilities. This invention also relates to methods for producing these compounds.

More specifically, the compounds of this invention are exemplified by the following formula:

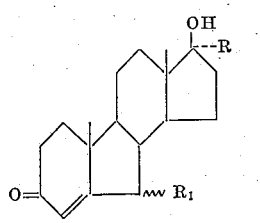

Formula I in which R is methyl or ethyl and $R_1$ is hydroxy, chloro, or when taken together with the 6-carbon atom, keto. These compounds are prepared by the following procedures:

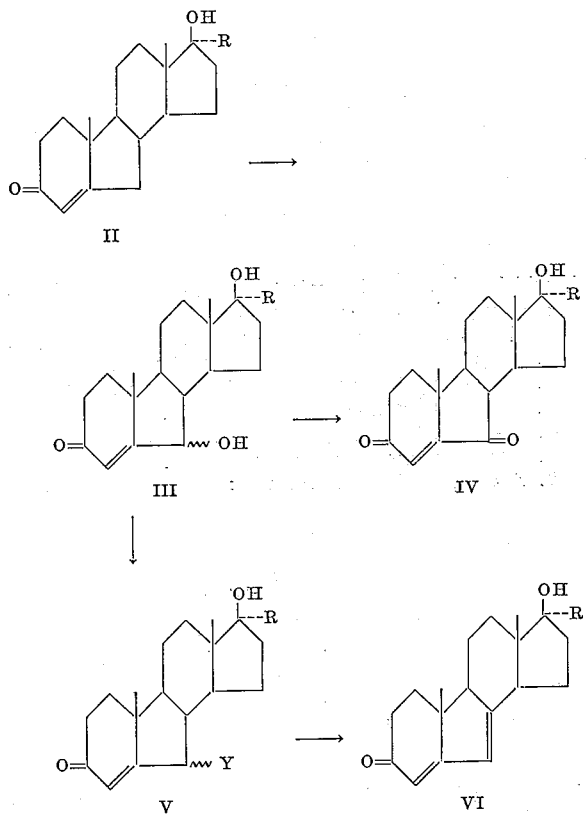

Either 17α-methyl or ethyl-B-nortestosterone (II), U.S. Patent No. 3,072,681) is biotransformed using the organisms *Trichothecium roseum* or preferably *Rhizopus arrhizus* into the 6α-hydroxy compound, the 6β-hydroxy compound or both. The fermentation is carried out as described in our copending applications Serial Numbers 350,672, 350,642, and 350,641, all filed March 10, 1964 and by the examples appended hereto.

The 6-hydroxy-17α-alkyl-B-nortestosterone (III) is oxidized using chromic acid in acetone to give 6-keto-17α-alkyl-B-nortestosterone (IV) of use as an intermediate and as having sedative properties.

Compound III, either the α or β isomer, is reacted with p-toluenesulfonyl chloride or bromide in pyridine at room temperature to give the 6-halo derivative of opposite configuration at 6 (V). These valuable intermediates are used to form the antiandrogenic and sedative $\Delta^{6,8}$-B-nor-17α-alkyltestosterones (VI) by dehydrohalogenation by heating or preferably heating in an excess of base, such as lithium chloride-carbonate mixture. These 6-halo intermediates are also useful for introducing amine substituents at position 6 by reaction with ammonia, primary or secondary amines such as methylamine, dimethylamine, ethylamine, diethylamine, piperidine, piperazine, morpholine, etc., to give a series of active antiandrogenic agents:

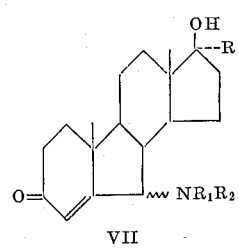

VII in which $R_1$ and $R_2$ are hydrogen, lower alkyl of less than 8 carbon atoms or together form a basic monocyclic ring such as morpholino, piperidino, piperazino, pyrrolidino, etc.

The 6α or β-hydroxy-B-nor-17α-methyl or ethyl testosterones (III) also are useful intermediates for preparing 17β-hydroxy-17α-methyl or ethyl-B-nor-androstan-3,6-diones (VIII) by reaction in a suitable organic solvent in which the steroid is soluble such as benzene with an aluminum salt such as alumina at about room temperature for extended periods of time, such as 12–14 hours. These diones are useful intermediates as will be apparent to those skilled in the art, such as for preparing the 6-keto compounds of Formula IV by inserting the 3-keto-$\Delta^4$ system.

The invention as described hereabove and in the illustrative examples will suggest obvious variations to those skilled in the art. Such are considered within the ambit of this invention. The hydroxy derivatives of this invention may be acylated with acyl halides or anhydrides as known to the art to give O-acyl derivatives whose acyl moieties are derived from stable organic carboxylic or sulfonic acids having less than 10 carbon atoms, such as acetyl, propionyl, benzoyl, ethylsulfonyl, etc. Other standard substituents on the norsteroid ring at other than the 6-methylene position do not substantially block the biotransformation reaction as described. The term "lower alkyl" at position 17 is used to include methyl and ethyl.

*Example 1*

The fermentation medium is comprised of 10 liters of 2% corn steep liquor adjusted to pH 6.5 with sodium hydroxide which has been autoclaved for two hours at 15 p.s.i., at 121° C. The fermentation is carried out in standard stir jars with a water bath temperature of 28–30° C. at an aeration rate of 3 liters of air per minute per 10 liters of medium. The impeller speed is 200 r.p.m. The inoculum is prepared by standard procedures using *Rhizopus arrhizus* ATCC 11145.

Five grams of 17α-methyl-B-nortestosterone in 50 ml. of 95% ethanol is added to the medium below its surface after 48 hours' growth—1 g. after 48 hours, 2 g. after 55 hours, 1 g. after 72 hours, and 1 g. after 78 hours. The fermentation is terminated 24 hours after the last substrate addition.

The solids are removed by centrifugation. The effluent broth is clarified further by filtration. The collected matter is washed with 1 l. of ethanol which is added to the aqueous broth phase.

The combined ethanol-aqueous broth is extracted exhaustively with methylene chloride. The dried organic extract is evaporated in vacuo at 50° C. The residue is taken into benzene and passed over a neutral alumina column (Woelm, III). Elution with increasing amounts of methylene chloride to pure methylene chloride to methanol in methylene chloride gives 6β-hydroxy-17α-methyl-B-nortestosterone, M.P. 196–199° C., 6α-hydroxy-17α-methyl-B-nortestosterone, M.P. 200–201° C., and 11α-hydroxy-17α-methyl-B-nortestosterone, M.P. 202–205° C.

Example 2

A fermentation medium is prepared using 20 g. of Edamine enzymatic digest of lactalbumin (Sheffield Co.), 50 g. of commercial dextrose (cerelose), 5 g. of corn steep liquor and water to one liter. Ten liters of medium is adjusted to pH 6.3–6.5 with sodium hydroxide then autoclaved 1½ hours at 15 p.s.i. at 121° C. The fermentation is carried out as above with an aeration ratio of 5 liters of air per minute per 10 liters with an impeller speed of 200 r.p.m. The media is inoculated with prepared *Trichothecium roseum* ATCC 12543 and fermented for 48 hours. The cells from 10 liters of medium are collected by centrifugation, washed with distilled water and suspended in 10 liters of 0.1 M. trishydroxymethylamino methane buffer (pH 9.0) then returned to a stir jar. Concentrated sterile glucose solution is added to 0.5% concentration.

The aeration rate for bioconversion is 4 liters of air per minute per 10 liters of buffered suspension at 250 r.p.m. 17α-methyl-B-nortestosterone solution in 95% ethanol (1 g./10 ml.) is added as follows: 2.5 g. at once, 2.5 g./10 liters after 18 hours, 2.5 g. after 42 hours, etc., to total of 52 g. of substrate. Sterile glucose is added to keep the concentration at 0.5%. The fermentation is terminated 108 hours after the first addition of substrate.

Following fermentation, the cells are separated. Extraction of the cells and broth is carried out with methylene chloride as in Example 1 to give a crude residue after evaporation. This is treated with boiling acetone. The insoluble material is separated and recrystallized from chloroform-methanol to give 15α-hydroxy-17α-methyl-B-nortestosterone (21%).

The acetone soluble fraction is evaporated and the residue chromatographed over neutral alumina (Woelm, III). Elution with benzene-methylene chloride gives 6α-hydroxy-17α-methyl-B-nortestosterone (4%). Elution with methylene chloride and methylene chloride-methanol gives a solid which is purified by recrystallization from acetone-hexane to give 11α-hydroxy-17α-methyl-B-nortestosterone, M.P. 202–205° C.

Example 3

A solution of 1.5 g. of 6α-hydroxy-17α-methyl-B-nortestosterone and 1.12 g. of p-toluene sulfonyl chloride in 10 ml. of pyridine is allowed to stand at room temperature for 72 hours. The reaction mixture is poured into water and extracted with methylene chloride. The organic extracts are combined, washed with dilute phosphoric acid, dried and evaporated to leave a residue which is purified by chromatography over 60 g. of alumina (Woelm, III) with a benzene developing solvent to give 6β-chloro-17α-methyl-B-nortestosterone, M.P. 127–129° C.

The 6α-chloro isomer is prepared similarly using the 6β-hydroxy isomer as starting material. Other 6-halo congeners can be prepared by using the corresponding tosyl halide or by adding a large excess of the particular sodium or potassium halide to the reaction described above.

Example 4

A mixture of 0.1 g. of 6β-chloro-17α-methyl-B-nortestosterone, 0.2 g. of lithium chloride, 0.2 g. of lithium carbonate and 10 ml. of dimethylformamide is heated at reflux for six hours. The cooled reaction mixture is poured into water and extracted with benzene. Drying and evaporation of the combined organic extracts leaves a residue which is purified by crystallization from ether to give Δ⁶,⁸-17α-methyl-B-nortestosterone, M.P. 200–203° C.

Example 5

A solution of 1.2 g. of 6-hydroxy-17α-methyl-B-nortestosterone in 50 ml. of acetone is mixed with 2 ml. of standard chromic acid solution in the cold. After brief stirring, the reaction mixture is poured into cold water. Extraction with methylene chloride then recrystallization from acetone-hexane gives 6-keto-17α-methyl-B-nortestosterone, M.P. 174–176° C., a compound having sedative activity.

Example 6

A solution of 90 mg. of 6-hydroxy-17α-methyl-B-nortestosterone in 20 ml. of benzene is applied to a 4 g. column of alumina (Woelm, III). After standing for 18 hours, the column is eluted with benzene-methylene chloride. Evaporation gives 17β-hydroxy-17α-methyl-B-norandrostan-3,6-dione, M.P. 166–167° C.

This compound is converted to 6-keto-17α-methyl-B-nortestosterone by dehydrogenation with selenium dioxide (as per J. C. Banerji, D. H. R. Barton and R. C. Cookson, J. Chem. Soc., 1957, 5041).

Substitution of B-nor-17α-ethyltestosterone for its 17-methyl homologue in the biotransformation reactions of Examples 1 and 2 or the chemical Examples 3–6 gives the respective 17α-ethyl homologues.

What is claimed is:

1. A compound of the formula:

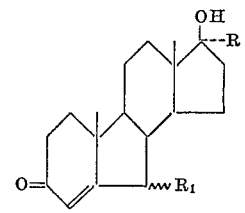

in which R is a member selected from the group consisting of methyl and ethyl; and R₁ is a member selected from the group consisting of hydroxy, chloro and bromo.

2. 6α-hydroxy-17α-methyl-B-nortestosterone.
3. 6β-hydroxy-17α-methyl-B-nortestosterone.
4. 6-halo-17α-methyl-B-nortestosterone.
5. 6β-chloro-17α-methyl-B-nortestosterone.
6. 6-keto-17α-methyl-B-nortestosterone.
7. A compound of the formula:

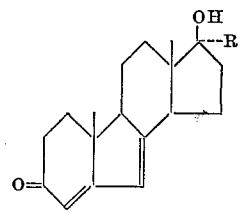

in which R is a member selected from the group consisting of methyl and ethyl.

8. Δ⁶,⁸-17α-methyl-B-nortestosterone.

9. A compound of the formula:

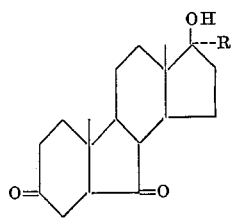

in which R is a member selected from the group consisting of methyl and ethyl.

10. 17β-hydroxy-17α-methyl-B-norandrostan-3,6-dione.

References Cited by the Examiner
UNITED STATES PATENTS 2,697,715 12/1954 Eppstein et al. _____ 195—51 X
2,844,513 7/1958 Wettstein et al. _____ 195—51 X

OTHER REFERENCES

Rull et al., "Bull. Chem. Soc. France," pp. 1581 to 1583 (1958).

LEON ZITVER, *Primary Examiner.*

B. HELFIN, *Examiner.*

M. JACOB, *Assistant Examiner.*